(12) United States Patent
Ott et al.

(10) Patent No.: US 7,137,278 B2
(45) Date of Patent: Nov. 21, 2006

(54) PROCESS FOR PRODUCING ALKALI-FREE ALUMINOSILICATE GLASS

(75) Inventors: Franz Ott, Mitterteich (DE); Karin Naumann, Ober-Olm (DE); Otmar Becker, Langen (DE); Ralf Diezel, Mitterteich (DE)

(73) Assignee: Schott AG, Mainz (DE)

( * ) Notice: Subject to any disclaimer, the term of this patent is extended or adjusted under 35 U.S.C. 154(b) by 541 days.

(21) Appl. No.: 10/396,146

(22) Filed: Mar. 25, 2003

(65) Prior Publication Data
US 2004/0018934 A1 Jan. 29, 2004

(30) Foreign Application Priority Data
Mar. 30, 2002 (DE) ................ 102 14 449

(51) Int. Cl.
*C03B 5/18* (2006.01)
*C03B 5/225* (2006.01)
*C03C 3/085* (2006.01)
*C03C 3/087* (2006.01)
*C03C 3/091* (2006.01)

(52) U.S. Cl. .............. 65/134.3; 65/134.1; 501/69; 501/70; 501/66

(58) Field of Classification Search ............ 501/68–70; 65/134.1, 13, 134.3
See application file for complete search history.

(56) References Cited

U.S. PATENT DOCUMENTS

| 3,148,994 | A | | 9/1964 | Voss | |
|---|---|---|---|---|---|
| 4,994,415 | A | * | 2/1991 | Imai et al. ................ | 501/66 |
| 5,244,847 | A | * | 9/1993 | Kushitani et al. ........... | 501/66 |
| 5,599,754 | A | * | 2/1997 | Maeda et al. .............. | 501/70 |
| 5,631,195 | A | | 5/1997 | Yanagisawa | |
| 5,801,109 | A | * | 9/1998 | Nishizawa et al. .......... | 501/66 |
| 5,811,361 | A | * | 9/1998 | Miwa ...................... | 501/70 |
| 5,851,939 | A | * | 12/1998 | Miwa ...................... | 501/70 |
| 5,885,914 | A | * | 3/1999 | Nishizawa et al. .......... | 501/66 |
| 6,169,047 | B1 | * | 1/2001 | Nishizawa et al. .......... | 501/66 |
| 6,214,429 | B1 | * | 4/2001 | Zou et al. ................ | 428/64.1 |
| 6,881,692 | B1 | * | 4/2005 | Murata et al. ............. | 501/66 |
| 2002/0151426 | A1 | * | 10/2002 | Murata et al. ............. | 501/66 |

FOREIGN PATENT DOCUMENTS

| EP | 0 204 431 | | 12/1986 |
|---|---|---|---|
| EP | 0 769 481 A1 | | 4/1997 |
| JP | 55003367 | | 1/1980 |
| JP | 01005927 A | | 1/1989 |
| JP | 3040933 | | 2/1991 |
| JP | 10025132 A | * | 1/1998 |
| JP | 10-324526 | | 12/1998 |
| JP | 2004299947 A | * | 10/2004 |
| WO | 98/49111 | | 11/1998 |

OTHER PUBLICATIONS

Machine Translation of JP 10-25132 A.*
Machine Translation of JP 2004-299947 A.*
Glasrechnische Fabrikationsfehler Edited by H. Jebsen-Merwedel and R. Brieckner, 3-D Edition, 1980, Spring-Verlag, pp. 195-197.
Glasrechnische Fabrikationsfehler Edited by H. Jebsen-Merwedel and R. Brieckner, 3-D Edition, 1980, Spring-Verlag, pp. 231-233.
J. Lange in "Rohstoffe Der Glasindustrie", 3-D Edition, 1993, Berlag Fuer Grundstoffondustrie, Leipzig, Stuttgart, pp. 176-181.

* cited by examiner

*Primary Examiner*—Karl Group
*Assistant Examiner*—Elizabeth A. Bolden
(74) *Attorney, Agent, or Firm*—Michael J. Striker

(57) ABSTRACT

The process of the invention produces alkali-free aluminosilicate glass having an $Al_2O_3$-content of more than 12% by weight with the addition of from 0.005% by weight to 0.6% by weight of sulfate for batch formulation.

16 Claims, No Drawings

PROCESS FOR PRODUCING ALKALI-FREE ALUMINOSILICATE GLASS

BACKGROUND OF THE INVENTION

1. Field of the Invention

The invention relates to a process for producing aluminosilicate glass, which, apart from inevitable impurities, is free of alkali metals and contains more than 12% by weight of $Al_2O_3$ (in % by weight, based on oxide content), with addition of a fining agent to the batch formulation.

2. Description of the Related Art

Processes for producing glass comprise the process steps of batch formulation, also known as batch charging, melting of the glass and subsequent hot-forming thereof. In this context, the term melting also encompasses the steps of fining, homogenizing and conditioning for further processing, which follow the melting-down operation.

With regard to melts, the term fining is understood as meaning the removal of gas bubbles from the melt. In order to achieve a very high level of freedom from extraneous gases and bubbles, it is necessary for the melted batch to be thoroughly mixed and degassed. The characteristics of gases and bubbles in the glass melt, and their removal, are described, for example, in "Glastechnische Fabrikationsfehler" [glass-making defects], edited by H. Jebsen-Marwedel and R. Brückner, 3rd Edition, 1980, Springer-Verlag, pages 195 ff.

There are two fundamentally different fining processes, which are common knowledge; they differ essentially in the way in which the fining gas is produced:

In the case of mechanical fining, gases such as water vapor, oxygen, nitrogen or air are injected through openings in the bottom of the melting unit. This process is known as bubbling.

The most frequent fining processes are the chemical processes. Their principle consists in adding to the melt or even to the batch compounds which decompose in the melt and in doing so release gases, or
 compounds which are volatile at relatively high temperatures, or
 compounds which give off gases at relatively high temperatures in an equilibrium reaction.

As a result, the volume of existing bubbles is increased and their distension is intensified. The last-named compounds include what are known as redox fining agents, such as antimony oxide and arsenic oxide. In the case of this process, which is the most frequently used in practice, the redox fining agents employed comprise polyvalent ions which are able to exist in at least two oxidation states and which are in a temperature-dependent equilibrium with one another; at high temperatures a gas, usually oxygen, is released.

The second group, made up of compounds, which are volatile at high temperatures owing to their vapor pressure and so exert their effect, includes, for example, chlorides, for example sodium chloride, and various fluorides. These are referred to collectively as evaporating fining agents.

The redox fining and the evaporating fining are linked to the temperatures at which, on account of the thermodynamic conditions, the corresponding redox or evaporating (or sublimation) processes take place. For many glass melts, such as the melts of soda-lime glasses and other relatively low-melting glasses (e.g. borate glasses, lead glasses), these options are sufficient.

However, in the case of glasses with melting points (temperature at which the viscosity is approx.$10^2$ dPas) of between approx. 1550° C. and 1650° C., which for sufficient fining means temperatures of more than 1600° C., the increased viscosity of the glass melt means that the formation of the bubbles deteriorates. The tendency of the bubbles to grow is reduced and they are less able to rise than at lower viscosities. Therefore, fine bubbles are formed, and these bubbles can no longer be removed or can only be removed with very great difficulty, even by reducing the throughput or by using higher temperatures, making glasses of this type unusable, since the resorption action of the chemical redox refining agent, e.g. of the $Sb_2O_3$, i.e. the ability to resorb the oxygen or other gases from the fine bubbles and thereby remove them during cooling, is insufficient for many high-melting glasses.

The possibilities for increasing the temperatures in order to reduce the viscosity and lengthen the melting and fining times, which in principle do exist to a certain extent, are also not economical, since, by way of example, the latter measure would make the melting capacities too low.

A further drawback of many redox fining agents and evaporating fining agents is that they are environmentally harmful or at least are not environmentally friendly. This is true, for example, of fluorides, of arsenic oxide and also of antimony oxide. Alternative redox fining agents, for example cerium oxide, are relatively expensive replacement substances.

The high-melting glasses mentioned above include primarily alkali-free aluminosilicate glasses containing more than 12% by weight of $Al_2O_3$, in particular those which contain little or no $B_2O_3$, in particular aluminosilicate glasses as used, because of their high thermal stability which is associated with the high melting points, as substrate glasses, for example in display technology, or in particular as lamp glasses, for example for halogen lamps.

In the case of glasses for halogen lamps, a further drawback of $Sb_2O_3$ consists in the fact that, at least in relatively high proportions, it promotes the undesirable blackening on the inner side of the bulb, which is caused by tungsten deposition resulting from disturbances to the regenerative halogen cycle, and that during hot flame processing the pinch, i.e. the fusion between glass and supply conductor wires, acquires a brown discoloration on account of the reduction of the antimony oxide.

The first type of chemical fining, i.e. fining by means of compounds, which decompose and in doing so release gases, includes sulfate fining. This fining too is known for low-melting glasses, such as soda-lime glasses, since the commonly used $Na_2SO_4$ (in the case of mass-produced glasses, also in the form of Glauber's salt $Na_2SO_4 \cdot 10H_2O$) reacts with the $SiO_2$ which is always present at temperatures, which, in comparison with $Na_2SO_4$, which is relatively stable on its own, are low, in accordance with equation (1) or (2):

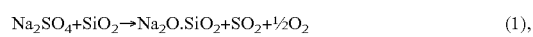
(1), or

(2)

The action of the sulfate fining is highly dependent on the chemical solubility of $SO_3$ or of $SO^{2-}_4$. Dissolved $SO_3$ in the glass does not have a fining action, but rather leads to seeding (seed formation) in the glass, i.e. to fine bubbles, or, in the event of super saturation, to the formation of salt bubbles. These are to be understood as meaning pools, predominantly of molten sodium sulfate, which float on the glass flux. The fining action of the sulfate is only produced by reaction with reducing agents, which are also added, for example coal, blast-furnace slag or sulfides. In the process, $SO_3$ reacts to form $SO_2$ and $½O_2$. Unlike $SO_3$, $SO_2$ has a low solubility in the glass. It is precipitated and forms bubbles or promotes the growth of existing bubbles.

For example, both Jebsen-Marwedel and Bruckner (loc. cit., pp. 231 ff.) and J. Lange in "Rohstoffe der Glasindustrie" [raw materials in the glass industry], 3rd Edition, 1993, Verlag für Grundstoffindustrie, Leipzig, Stuttgart pp. 176 ff, describe the formation of seeds in oxidic glass melts. The formation of $SO_2$ bubbles and their growth does not occur. The glass is not degassed or is only badly degassed, and a large number of fine bubbles or seeds remain. Sulfate fining is not suitable for glass melts of this type.

On the other hand, in view of the intended applications for the alkali-free aluminosilicate glass, reducing melting conditions or the addition of reducing agents are not possible. For example, in the case of halogen lamp glasses, the likelihood of blackening as a result of tungsten deposition would rise to such an extent that the glasses would become unusable for this application.

The patent literature has already disclosed aluminum-containing glasses from a broad range of compositions, which, in addition to other fining agents, may also contain sulfate.

For example, JP 10-25132 A describes glasses to which, in addition to $SO_3$, chloride, given as up to 2% by weight of $Cl_2$, is added, while JP 10-324526 A mentions glasses to which one component selected from the group consisting of $Fe_2O_3$, $Sb_2O_3$, $SnO_2$, $SO_3$ and one component selected from the group consisting of Cl and F is added and which still also contain $As_2O_3$.

Furthermore, alkali-containing glasses (U.S. Pat. No. 3,148,994; U.S. Pat. No. 5,631,195; EP 0 769 418 A1;JP 3-40933 A; WO 98/47111 A) and/or low-aluminum glasses (JP 55-3367 A; EP 0 769 481 A1), which are intended to be fined using sulfate, are known.

Moreover, EP 204 431 A2 has disclosed an arsenic-containing glass to which between 2.95 and 11.8% by weight of sulfate, expressed as $SO_3$, is added. Such a high level of sulfate is used not as a fining agent but rather to form a structure in the network of the glass.

SUMMARY OF THE INVENTION

It is an object of the present invention to provide a process for producing aluminosilicate glasses in which the glass melt is effectively fined, i.e. in which glass with a high quality in terms of being free of bubbles or having only a low level of bubbles results, and which allows inexpensive fining of the glass melts for the glasses which melt at high temperatures.

The object is attained by a process for producing aluminosilicate glass containing more than 12% by weight, based on oxide content, of aluminum oxide and free of alkali metals, apart from inevitable impurities, which comprises the steps of:

a) formulating a batch of raw materials;

b) adding at least one fining agent to the batch;

c) melting the batch to form molten glass, which includes fining and homogenizing; and d) after the melting, hot-forming the molten glass formed from the batch;

wherein the batch contains from 0.005% by weight to 0.6% by weight of at least one sulfate, based on $SO_3$, and wherein the batch does not contain any evaporating fining agents.

In the process for producing aluminosilicate glass, which, apart from inevitable impurities, is free of alkali metals and contains more than 12% by weight, preferably more than 13.5% by weight, of $Al_2O_3$ (in % by weight, based on oxide), which comprises the process steps of batch formulation, melting of the glass and subsequent hot-forming, in which the term "melting", in addition to the initial melting of the raw materials and cullet, also includes the subsequent steps of fining and homogenizing, at least one fining agent, and specifically between 0.005% by weight and 0.6% by weight, based on $SO_3$, of at least one sulfate is added to the batch. For example, 0.005% by weight corresponds to 0.015% by weight of $BaSO_4$, which is the sulfate, which is preferably used. Also 0.6% by weight of $SO_3$ corresponds to 2.0% by weight of $BaSO_4$. It is preferable to add sulfate(s) in amounts corresponding to 0.03% by weight to 0.2% by weight of $SO_3$.

The term inevitable is intended to mean the level of alkali metal oxide impurities, which occurs when low-alkali raw materials are used and with clean conditions during batch preparation and in the insert part of the melting tank.

The addition of sulfate initiates the formation and growth of gas bubbles in the glass melt. Even with the small amount, which is given as the lower limit, the aluminosilicate glass is effectively fined. It was impossible to predict and altogether surprising that the fining action in the alkali-free aluminosilicate glass melts with high aluminum content is sufficiently good, even without the addition of reducing agents. It is even possible for nitrates to be used as raw materials and for polyvalent compounds to be added in their oxidized form, e.g. $Fe_2O_3$, without the glass quality being impaired.

It is even the case that the glass quality of the glass, which has been fined by the addition of sulfate is improved further by the addition of $Fe_2O_3$. Therefore, it is preferable for between 0.015% by weight and 1% by weight of $Fe_2O_3$ to be added to the batch. It is particularly preferable for from 0.03 to 0.45% by weight of $Fe_2O_3$ to be added.

The sulfate can be added in the form of one or more sulfates, e.g. $MgSO_4$, $CaSO_4$, $SrSO_4$, $BaSO_4$, $ZnSO_4$, $Na_2SO_4$ or other alkali metal and/or alkaline earth metal sulfate(s), the use of $BaSO_4$ being preferred. The sulfate used must in this case be selected in such a way that its decomposition temperature is matched to the viscosity of the glass melt or to the fining temperature of the glass. Specifically, there must still be undecomposed sulfate available at the time of fining, and this sulfate then—without additional reducing agents—decomposes to form $SO_2$ and $O_2$ and thereby effects degassing of the glass. If the sulfate decomposes prematurely, the fining is insufficient and the glass still has seeds. The person skilled in the art will readily be able to appropriately adapt the relevant tank and melting parameters.

In the process as defined in the invention, it is possible for further fining agents to be added as well as the sulfate, which is crucial to the invention. For example, the glasses, which are produced using the process, may contain up to 1% by weight of $SnO_2$, up to 2% by weight of $CeO_2$, preferably up to 0.3% by weight, up to 1% by weight of $As_2O_3$, preferably only up to 0.2% by weight, and up to 2% by weight of $Sb_2O_3$, preferably only up to 0.1% by weight. With this group of fining agents, the quantity of additive corresponds to the quantity in the finished glass. If desired, these additives allow the glass quality, which is already very good and quite sufficient for the above-mentioned applications of lamp glass, substrate glass in display technology, to be improved still further. It is preferable not to have the two components, which were mentioned last for the sake of environmental compatibility.

The glasses produced using the process as defined in the invention may also contain the following polyvalent compounds: up to 2% by weight of $MoO_3$, up to 2% by weight of $WO_3$ and up to 2% by weight of $V_2O_5$. However, the sum of $MoO_3$, $WO_3$, $V_2O_5$, $SnO_2$, $CeO_2$, $As_2O_3$ and $Sb_2O_3$ should not exceed 3% by weight.

It is particularly advantageous that in the process as defined in the invention no evaporating fining agents, such as chlorides and fluorides, are used. For effective fining, on account of the high solubility in the glass, in particular of the fluorides, the quantities required would be so great that the physical and chemical properties of the glasses would be altered.

The process according to the invention is used to produce aluminosilicate glasses, which are free of alkali metals apart from inevitable impurities and which have high $Al_2O_3$ contents, i.e. to produce glasses, which have high melting and fining temperatures.

The process according to the invention is particularly suitable for the production of aluminosilicate glasses with melting points >1600° C. Therefore, the process is preferably used to melt glasses with a composition from the following range (in % by weight, based on oxide) $SiO_2$ 46–70, preferably 46–64, particularly preferably 48–64, very particularly preferably 50–64; $Al_2O_3$>12–27, preferably >12–26, particularly preferably >13.5–26; $B_2O_3$ 0–15, preferably 0–5.5; MgO 0–10, preferably 0–7; CaO 0–12, preferably 3–14, SrO 0–15, preferably 0–11; BaO 0–25, preferably 6–25, particularly preferably 6–17, with MgO+CaO+SrO+BaO$\geqq$8; ZnO 0–10, preferably ZnO-free; $ZrO_2$ 0–5; $TiO_2$ 0–3, preferably 0–0.5; $P_2O_5$ 0–9.

The person skilled in the art knows how to carry out the process step of batch formulation using suitable raw materials in such a way that a glass of the composition described is obtained. For example, as is known, $P_2O_5$ is highly volatile, and consequently up to 20% of this component may evaporate when the glass is being melted down, a fact that must be taken into account during batch preparation.

The process is used in particular to produce aluminosilicate glasses with coefficients of thermal expansion $\alpha_{20/300}$ of <7.5·10$^{-6}$/K.

The process is used in particular to produce what is known as hard glasses, i.e. glasses with high transformation temperatures Tg (>600° C.) and a low thermal expansion ($\alpha_{20/300}$<7.5·10$^{-6}$/K).

The process is used in particular to produce high melting glasses, which contain little or no $B_2O_3$, i.e. 5.5% by weight, preferably <3% by weight.

These glasses preferably contain at least 0.5% by weight of $B_2O_3$, and these glasses preferably contain at most 20% by weight of the alkaline-earth metal oxides, i.e. of the sum of MgO+CaO+SrO+BaO.

The process is used in particular to produce glass with a composition comprising (in % by weight, based on oxide content): $SiO_2$ 46–63; $Al_2O_3$>12–25, preferably >13.5, particularly preferably >17; MgO 0–5; preferably 0–4; CaO 3–14, SrO 0–11; BaO 6–15, with MgO+CaO+SrO+BaO $\leqq$25, with SrO+BaO $\geqq$10; $ZrO_2$ 0.1–5; $P_2O_5$ 0.1–9, preferably 0.5–9, which are able to withstand high thermal stress and are suitable for use both as substrate glasses for display technology and for photovoltaics and as lamp bulb glasses for halogen lamps.

For these uses, in particular for the latter use, glass, which is produced using the process as defined in the invention and has the following compositions (in % by weight, based on oxide content): $SiO_2$>55–64, $Al_2O_3$ 13–18, preferably >13.5–18, $B_2O_3$ 0–5.5, MgO 0–7, CaO 5–14, SrO 0–8, BaO 6–17, $ZrO_2$ 0–2, $TiO_2$ 0–0.5; are also particularly suitable.

In this context, glass with a composition (in % by weight, based on oxide content) comprising: $SiO_2$ 59–62; $Al_2O_3$ 13.5–15.5, preferably >13.5–15.5, $B_2O_3$ 3–5.5, MgO 2.5–5, CaO 8.2–10.5, BaO 8.5–9.5 $ZrO_2$ 0–1.5, $TiO_2$ 0–0.5; is suitable primarily as bulb glass for halogen lamps with bulb temperatures of at most 650° C., while glass with a composition (in % by weight, based on oxide) comprising: $SiO_2$>58–62; $Al_2O_3$ 14–17.5, preferably 15–17.5; $B_2O_3$ 0–1, preferably 0.2–0.7; MgO 0–7, preferably 0–<1; CaO 5.5–14; SrO 0–8; BaO 6–17, preferably 6–10; $ZrO_2$ 0–1.5, preferably 0.05–1; $TiO_2$ 0–0.5, is suitable for halogen lamps with bulb temperatures of more than 650° C.

The hot-forming process step mentioned encompasses a very wide range of standard hot-forming methods, such as drawing, to form tubes or ribbons, or floating or rolling, casting, blowing, pressing, as are employed depending on the intended use of the glasses produced, flat or hollow glasses. In this respect too, the person skilled in the art will readily be able to select the appropriate glass composition and to choose the parameters of the hot-forming process step accordingly.

The step of the production process according to the invention, which is crucial to the invention, namely the addition of the above-mentioned quantity of sulfate, results in very effective fining, which manifests itself in the excellent glass quality, i.e. absence of bubbles and seeds, in the glasses produced, but is also reflected by the fact that it is impossible to detect any in the finished glasses using standard analytical methods, i.e. the S content is <0.001%, i.e. the sulfate has been completely or almost completely converted into $SO_2$ and has left the glass melt in the form of bubbles. This has led to very effective degassing of the glass.

Therefore, the process according to the invention includes effective and inexpensive fining of the glasses. In particular glass melts at the standard fining temperatures have a high viscosity, for example glasses which are free of alkali metals and contain little or no boron, and are therefore difficult to fine, can be fined to form glasses with a high glass quality and with high melting capacities.

A further advantage of the process according to the invention is that during the fining by means of sulfate, unlike with fining by means of antimony oxide, no fresh bubbles are formed during the agitation involved in glass conditioning, i.e. there is no reboil.

The fining by means of sulfate is environmentally friendly, and the products, which have been fined in this way are not restricted in terms of their ability or capacity to be disposed in a landfill by the fining process.

The process as defined in the invention is particularly advantageous for the production of alkali-free halogen lamp glasses, which, on account of the need for them to be able to withstand high temperatures, have high melting points. In this case, it can completely replace the fining by means of $Sb_2O_3$.

In the case of halogen lamp glasses produced using the process, the blackening of the inner side of the bulb is reduced even at the above-mentioned high operating temperatures of the lamp and after prolonged use of the lamp, i.e. the regenerative halogen cycle in the lamp is more stable than with $Sb_2O_3$-fined glasses. There is also no brown discoloration of the pinch during hot flame processing.

The process as defined in the invention for producing alkali-free aluminosilicate glasses, unlike the production of soda-lime glasses with sulfate fining, can be carried out without the use of reducing agents and makes do with relatively small quantities of added sulfate.

The invention is to be explained in more detail with reference to exemplary embodiments.

In order to set the transmission a glass of basic composition (in % by weight, based on oxide): 59.1, $SiO_2$; 4.6, $B_2O_3$; 14.5, $Al_2O_3$; 8.8, BaO; 10.3, CaO; 2.5, MgO; 0.18, $Sb_2O_3$ and 0.04, $Fe_2O_3$; was melted and fined in a melting tank at >1630° C. as a comparative example. The raw materials used were oxides and carbonates. Also 1.5% by weight of the BaO was used in the form of barium nitrate.

The batch was fed continuously to a melting tank by means of a charging machine, during which process the quantity supplied was controlled by means of the level of the liquid glass in the tank. This charging operation is also encompassed by the term batch formulation in the description of the invention. The melting up to batch-free time, fining and cooling down of the molten glass were carried out in the usual way by reducing the temperature. The glass was thermally and chemically conditioned by agitation in a working end and a subsequent forehearth—a manifold is also possible at this point.

In the description of the invention, these individual steps are summarized by the term, "melting". The glass was fed to the joint head via a forehearth and was drawn as a tube using the Vello process. The bubble count of the glass produced in this way is 20/kg of glass and cannot be reduced even by lowering the melting capacity by 20%. In particular small and very small bubbles, known as seeds, i.e. the bubbles which have an elongate length <1 cm on the tube, constitute the most frequent glass defects in the product.

As exemplary embodiment 1, a glass of the same basic composition as the comparative example was produced, containing 0.04% by weight of $Fe_2O_3$, but without any $Sb_2O_3$. However 0.5% by weight of the BaO was added in the form of barium nitrate and 0.2% by weight of the BaO was added in the form of barium sulfate, corresponding to 0.1% by weight of $SO_3$. Otherwise, the same raw materials were used and melting was carried out with the same melting capacity.

It was possible to reduce the bubble count to less than 5 per kg of glass, which illustrates how effective the fining is. The fact that in addition to there being a small number of relatively large bubbles there were scarcely any fine seeds present, the fact that the desired effect, namely the reduction in the fine bubbles in favor of a small number of large bubbles, which were able to rise more easily and have left the melt, has occurred, are further signs of the very good fining action.

Tubes produced in accordance with the comparative example and exemplary embodiment 1 were processed to form tungsten halogen lamps and were subjected to a lighting test at 650° C. The lamp made from sulfate-fined glass (exemplary embodiment) did not have any blackening on the bulb surface, even after a lighting time which was five times longer than the lighting time at which blackening occurred in the comparison group of lamps made from $Sb_2O_3$-fined glass (comparative example). The halogen cycle therefore remains stable.

In a further sulfate-fined melt, it was possible to increase the melting capacity by approx. 50% compared to the comparative example and exemplary embodiment 1 without the bubble quality being adversely affected. In the event of the melting capacity being increased using an $Sb_2O_3$-fined melt, the bubble quality becomes so poor that the glasses are unsuitable.

In a test melt on a small scale (laboratory crucible), with a glass having the composition of exemplary embodiment 1, i.e. with sulfate fining, the bubble count visible to the naked eye was reduced further, by approximately half, as a result of the $Fe_2O_3$ concentration being increased from 0.04% by weight to 0.06% by weight under the same melt conditions.

As a further example (exemplary embodiment 2), a glass having the basic composition (in % by weight, based on oxide): 60.7, $SiO_2$; 0.3, $B_2O_3$; 16.5, $Al_2O_3$; 7.85, BaO; 13.5, CaO; 1.0, $ZrO_2$ and 0.04, $Fe_2O_3$ to set the transmission was produced. However 0.5% by weight of the BaO was added in the form of barium nitrate and 0.3% by weight of the BaO was added in the form of barium sulfate, corresponding to 0.15% by weight of $SO_3$. The melting temperature was >1640° C., but otherwise the production conditions corresponded to those described above. In this case too, an excellent glass quality with <5 bubbles/kg of glass was produced.

The disclosure in German Patent Application 102 14 449.4-45 of Mar. 30, 2002 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in a process for producing alkali-free aluminosilicate glass, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. A process of producing aluminosilicate glass containing more than 13.5% by weight, based on oxide content, of aluminum oxide and free of alkali metals, apart from inevitable impurities, said process comprising the steps of:
   a) formulating a batch of raw materials;
   b) adding at least one fining agent to said batch;
   c) melting the batch to form molten glass, said melting including fining and homogenizing; and
   d) after the melting, hot-forming the molten glass formed from the batch;
   wherein the batch contains from 0.005% by weight to 0.6% by weight of at least one sulfate, based on $SO_3$, but wherein the batch does not contain any evaporating fining agents; and
   whereby said aluminosilicate glass is formed containing more than 13.5% by weight, based on oxide content, of said aluminum oxide and free of said alkali metals, apart from said inevitable impurities.

2. The process as defined in claim 1, wherein the batch contains from 0.03% by weight to 0.2% by weight of said at least one sulfate, based on $SO_3$.

3. The process as defined in claim 1, wherein the batch contains from 0.015 to 1% by of $Fe_2O_3$.

4. The process as defined in claim 1, wherein the batch contains from 0.03 to 0.45% by weight of $Fe_2O_3$.

5. The process as defined in claim 1, wherein the batch has a composition comprising, in % by weight, based on oxide content:

| | |
|---|---|
| $SiO_2$ | 46–70, |
| $Al_2O_3$ | >13.5–27, |
| $B_2O_3$ | 0–15, |
| MgO | 0–10, |
| CaO | 0–14, |
| SrO | 0–15, |
| BaO | 0–25, |
| with MgO + CaO + SrO + BaO | ≧8, |
| ZnO | 0–10, |
| $ZrO_2$ | 0–5, |
| $TiO_2$ | 0–3, |
| $P_2O_5$ | 0–9. |

6. The process as defined in claim 1, wherein said batch contains at least 0.5% by weight of said $B_2O_3$.

7. The process as defined in claim 6, wherein said batch contains at most 20% by weight of said MgO+CaO+SrO+BaO.

8. The process as defined in claim 1, wherein the batch has a composition comprising, in % by weight, based on oxide content:

| | |
|---|---|
| $SiO_2$ | 46–64, |
| $Al_2O_3$ | >13.5–26, |
| $B_2O_3$ | 0–5.5, |
| MgO | 0–7, |
| CaO | 3–14, |
| SrO | 0–11, |
| BaO | 6–25, |
| with MgO + CaO + SrO + BaO | ≧8, |
| $ZrO_2$ | 0–5, |
| $TiO_2$ | 0–0.5, |
| $P_2O_5$ | 0–9. |

9. The process as defined in claim 8, wherein said batch contains, in % by weight, based on oxide content, >65–64 of said $SiO_2$, >13.5–18 of said $Al_2O_3$, 5–14 of said CaO, 0–8 of said SrO, 6–17 of said BaO, 0–2 of said $ZrO_2$.

10. The process as defined in claim 9, wherein said batch contains, in % by weight, based on oxide content, 59–62 of said $SiO_2$, >13.5–15.5 of said $Al_2O_3$, 3–5.5 of said $B_2O_3$, 2.5–5 of said MgO, 8.2–10.5 of said CaO, 8.5–9.5 of said BaO, 0–1.5 of said $ZrO_2$.

11. The process as defined in claim 9, wherein said batch contains, in % by weight, based on oxide content, >58–62 of said $SiO_2$, 14–17.5 of said $Al_2O_3$, 0–1 of said $B_2O_3$, 5.5–14 of said CaO, 0–8 of said SrO, 6–17 of said SaO and 0–1.5 of said $ZrO_2$.

12. The process as defined in claim 11, wherein said batch contains, in % by weight, based on oxide content, 15–17.5 of said $Al_2O_3$, 0.2–0.7 of said $B_2O_3$, 0<1 of said MgO, 6–10 of said BaO and 0.05–1 of said $ZrO_2$.

13. The process as defined in claim 8, wherein said batch contains, in % by weight, based on oxide content, 46–63 of said $SiO_2$, >13.5–25 of said $Al_2O_3$, 0–5 of said MgO, 6–15 of said BaO, 0.1–5 of said $ZrO_2$, 0.1–9 of said $P_2O_5$ and wherein MgO+CaO+SrO+BaO ≦25 and SrO+BaO ≧10.

14. The process as defined in claim 1, wherein said batch contains from 0 to 2 percent by weight, based on oxide content, of each of $Sb_2O_3$, $CeO_2$, $MoO_3$, $WO_3$ and $V_2O_5$; from 0 to 1 percent by weight, based on oxide content, of each of $As_2O_3$ and $SnO_2$, and wherein $Sb_2O_3+As_2O_3+_{CeO2}+SnO_2+MoO_3+WO_3+V_2O_5$ is contained in said batch in an amount between 0 and 3% by weight, based on oxide content.

15. The process as defined in claim 1, wherein said at least one sulfate is selected from the group consisting of $CaSO_4$, $ZnSO_4$, $MgSO_4$, $Na_2SO_4$ and $SrSO_4$.

16. The process as defined in claim 1, wherein said batch contains $BaSO_4$.

* * * * *